United States Patent
Faguer et al.

(10) Patent No.: US 9,903,402 B2
(45) Date of Patent: Feb. 27, 2018

(54) PIECE TO BE CRIMPED ON A SUPPORT, DEVICE COMPRISING SUCH A PIECE AND METHODS FOR MANUFACTURING SUCH A PIECE AND SUCH A DEVICE

(71) Applicant: BOLLHOFF OTALU S.A., La Ravoire (FR)

(72) Inventors: Sylvain Faguer, Arbin (FR); Yann Bernard, Sonnaz (FR); Emmanuelle Berlire, Challes-les-Eaux (FR)

(73) Assignee: BOLLHOFF OTALU S.A., La Ravoire (FR)

( * ) Notice: Subject to any disclaimer, the term of this patent is extended or adjusted under 35 U.S.C. 154(b) by 150 days.

(21) Appl. No.: 14/733,542

(22) Filed: Jun. 8, 2015

(65) Prior Publication Data

US 2015/0377272 A1 Dec. 31, 2015

(30) Foreign Application Priority Data

Jun. 27, 2014 (FR) ..................... 14 01459

(51) Int. Cl.
*F16B 19/10* (2006.01)
*B21K 1/60* (2006.01)
*F16B 37/06* (2006.01)

(52) U.S. Cl.
CPC ............... *F16B 19/10* (2013.01); *B21K 1/60* (2013.01); *F16B 19/1072* (2013.01); *F16B 37/067* (2013.01)

(58) Field of Classification Search
CPC .... F16B 19/10; F16B 19/1072; F16B 37/067; B21K 1/60
See application file for complete search history.

(56) References Cited

U.S. PATENT DOCUMENTS

| 2,324,142 A | 7/1943 | Eklund |
| 3,055,255 A | 9/1962 | Burrell |
| 3,948,142 A | 4/1976 | McKay et al. |
| 4,499,647 A | 2/1985 | Sakamura et al. |
| 5,030,050 A | 7/1991 | Auriol et al. |
| 2004/0156694 A1 | 8/2004 | Behle et al. |
| 2008/0138168 A1 | 6/2008 | Schruff |

FOREIGN PATENT DOCUMENTS

| DE | 3240539 A1 | 11/1983 |
| DE | 102011053035 A1 | 2/2013 |
| EP | 0398403 A1 | 11/1990 |
| EP | 0536957 A1 | 4/1993 |
| EP | 1447576 A1 | 8/2004 |
| EP | 1918596 A1 | 5/2008 |
| FR | 2700817 A1 | 7/1994 |
| FR | 2870573 A1 | 11/2005 |
| GB | 2140889 A | 12/1984 |
| GB | 2157788 A | 10/1985 |
| WO | 2013030097 A1 | 3/2013 |

*Primary Examiner* — John C Hong
(74) *Attorney, Agent, or Firm* — Oliff PLC

(57) ABSTRACT

Piece to be crimped on a support, comprising a bearing head and a shaft comprising a crimping section intended to be deformed when crimping the piece, the crimping section comprising a first hollow section adjacent to the bearing head and a second section adjacent the first section, the second section being configured to deform outside of the piece into a crimping flange for crimping the piece on the support, and the first section is configured to deform inside the hollow space of the shaft into a clearance flange in order to limit stresses on the support when crimping the piece.

13 Claims, 4 Drawing Sheets

PIECE TO BE CRIMPED ON A SUPPORT, DEVICE COMPRISING SUCH A PIECE AND METHODS FOR MANUFACTURING SUCH A PIECE AND SUCH A DEVICE

TECHNICAL FIELD OF THE INVENTION

The invention concerns pieces to be crimped on a support.

STATE OF THE ART

A piece to be crimped is an element for assembling pieces, which is bulged at one end and whose other end is crushed. The piece can be a nut, a rivet, a screw or a bolt, or a piece having a spacer function or swivel function. A nut is a threaded hollow piece, that is to say it comprises an internal thread intended to be attached to another threaded piece. A rivet is an element for assembling flat pieces. A screw or bolt is a threaded solid piece, that is to say it comprises an external thread. A spacer is a connecting piece intended to be placed transversely between the piece having a spacer function and a secondary piece. In particular, such a spacer enables to maintain a constant distance between the support, on which the piece having a space function is crimped, and the secondary piece. A ball is a piece comprising a spherical head especially for providing a ball joint.

French patent application FR2870573 can be cited, which discloses a bolt to be crimped in a support, comprising a deformation zone intended to form a crimping flange. But these bolts generate radial stresses on the support, that is to say forces along lines perpendicular to the longitudinal axis of the bolt. European patent application EP1918596 can be cited, which discloses a blind crimping nut comprising a deformable portion provided with holes for weakening the wall of the deformable portion. However, the holes are intended to start the deformation of the nut in a specific area of the deformable portion in order to crimp the nut accurately. Such a nut does not enable to limit the radial stresses on the support.

French patent application FR2700817 can be cited, which discloses a rivet provided with a head and a shaft comprising a deformation zone. The deformation zone comprises a shape discontinuity dividing the deformation zone into a first truncated section adjacent to the shaft and widening in the direction opposite the shaft and a second section, between the head and the first section, which has a cylindrical outer side face. In addition, the thickness of the shaft wall adjacent to the first section gradually decreases toward the first section. The deformation zone is deformed into a crimping flange which contacts the support but causes radial stresses on the support. This rivet is thus not adapted for supports out of a composite material that can deform, delaminate, or crack under the action of radial forces. Composite material means a material comprising a matrix formed from a thermoplastic material such as polyolefines, polyamides or polypropylenes, or a thermosetting material, such as unsaturated polyesters, polyepoxides or polyurethanes, and which comprises reinforcing pieces made of a different material than the matrix, for example glass, carbon, aramide fibers, or the like, alone or in combination. Moreover, the decrease in thickness of the shaft enables to create a bend facing the interior of the rivet in order that the thinned wall deforms and blocks a threaded pin mounted in the shaft in order to obtain a traction necessary for the crimping process. This thinned wall does not enable to reduce the radial stresses on the support.

OBJECT OF THE INVENTION

The object of the invention is to overcome the disadvantages mentioned above, and in particular to provide a means for crimping a piece on a support that withstands no or little radial stresses, especially on a support out of a composite material.

According to one aspect of the invention, there is provided a piece to be crimped on a support, comprising a bearing head and a shaft having a crimping section intended to be deformed when crimping the piece, the crimping section comprising a first hollow section adjacent to the bearing head and a second section adjacent the first section.

The second section is configured to deform outside the piece into a crimping flange for crimping the piece on the support, and the first section is configured to deform inside the hollow space of the shaft into a clearance flange in order to limit the stresses on the support when crimping the piece. Thus, there is provided a piece whose crimping section limits the radial stresses on the support during the crimping operation. Such a piece is particularly suitable for supports out of a composite material. The piece is also suitable for supports made out of different fragile materials that withstand no or little radial stresses.

The first section comprises a bend projecting inside the hollow space of the shaft and subdividing the first section into a first truncated portion adjacent to the bearing head and widening in the direction of the bearing head, and into a second truncated portion adjacent to the second section and widening in the direction opposite the bearing head.

According to one embodiment, the second section has a truncated shape widening in the direction opposite the bearing head. Thus, it is provided a simple piece to produce.

In another embodiment, the second section comprises a bend projecting outside the shaft.

This feature enables to further improve the start of the deformation of the crimping section.

The second section can be hollow and the thickness of the wall of the second section is identical to that of the first section.

Thus, the piece can be achieved from a blank having a cylindrical shaft by deforming it, for example by means of jaws, at a point of the blank body.

The shaft can comprise a distal section adjacent to the second section, and the thickness of the wall of the distal section is greater than or equal to that of the second section.

Such a shaft enables to improve the start of the deformation of the crimping section in order to facilitate the crimping operation for the piece. Improving the deformation of the crimping section prevents the first section from being inadvertently deformed outside the piece that could come into contact with the support and generate radial stresses on the support.

The second truncated portion and the second section can have the same thickness and form a crimping segment, the length of the outer generatrix of the crimping segment being greater than or equal to that of the outer generatrix of the first portion.

The salient angle between the portions of the first section can be comprised between 90° and 175°.

The piece can be made out of stainless or non-stainless steel, or aluminum, or other deformable materials.

The bearing head can further comprise a bearing zone intended to be in contact with a surface of the support, and a clearance zone located at a distance from the surface of the support.

According to another aspect of the invention, there is provided a device comprising a support provided with a recess into which a piece as defined above is inserted.

According to still another aspect of the invention, there is provided a method for manufacturing a piece to be crimped on a support, the piece comprising a bearing head and a shaft, comprising a step of forming, at the shaft, a crimping section intended to be deformed when crimping the piece.

The step of forming the crimping section comprises:
- a formation of a first hollow section adjacent to the bearing head and configured to deform inside the hollow space of the shaft into a clearance flange in order to limit the stresses on the support when crimping the piece, and
- a formation of a second section adjacent to the first section and configured to deform outside the piece into a crimping flange for crimping the piece on the support.

The step of forming the first section includes a formation of a bend projecting inside the hollow space of the shaft and subdividing the first section into a first truncated portion adjacent to the bearing head and widening in the direction of the bearing head, and into a second truncated portion adjacent to the second section and widening in the direction opposite the bearing head.

According to one implementation, the second section has a truncated shape widening in the direction opposite the bearing head.

In another implementation, the step of forming the second section includes a formation of a bend projecting outside the shaft.

The piece to be crimped can be out of a metal and the method for manufacturing the piece to be crimped can lack a step for thermally treating the piece at a temperature above 100° C.

According to still another aspect, there is provided a method for manufacturing a device provided with a support having a recess, comprising the steps of:
- manufacturing a piece to be crimped according to the manufacturing method defined above,
- introducing the piece into the recess, and
- crimping the piece on the support.

BRIEF DESCRIPTION OF DRAWINGS

Other advantages and features will become more apparent from the following description of specific embodiments and implementations of the invention given as non-limiting examples and represented in the accompanying drawings, wherein.

DETAILED DESCRIPTION

Figure 1:
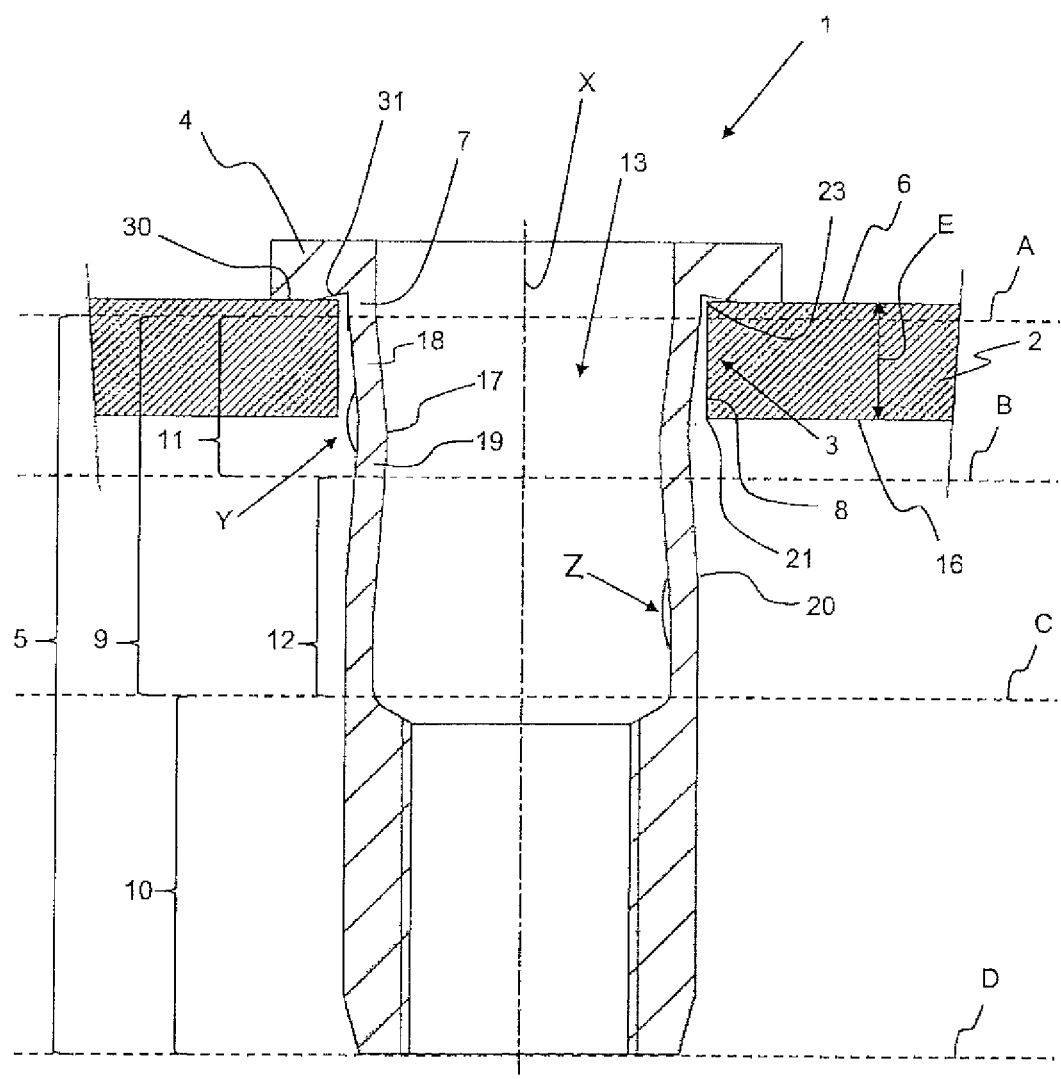
FIG. 1 schematically illustrates a sectional view of an embodiment of a piece to be crimped according to the invention, mounted on a support, before crimping.
Figure 2:
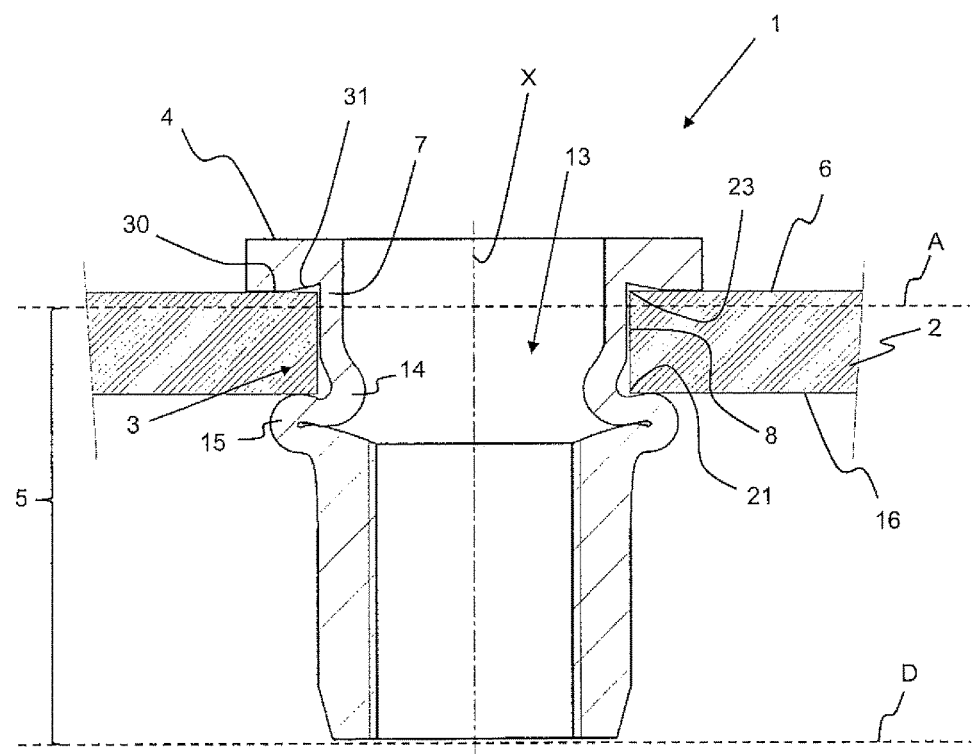
FIG. 2 schematically illustrates a sectional view of the piece in FIG. 1 crimped on the support.
Figure 4:
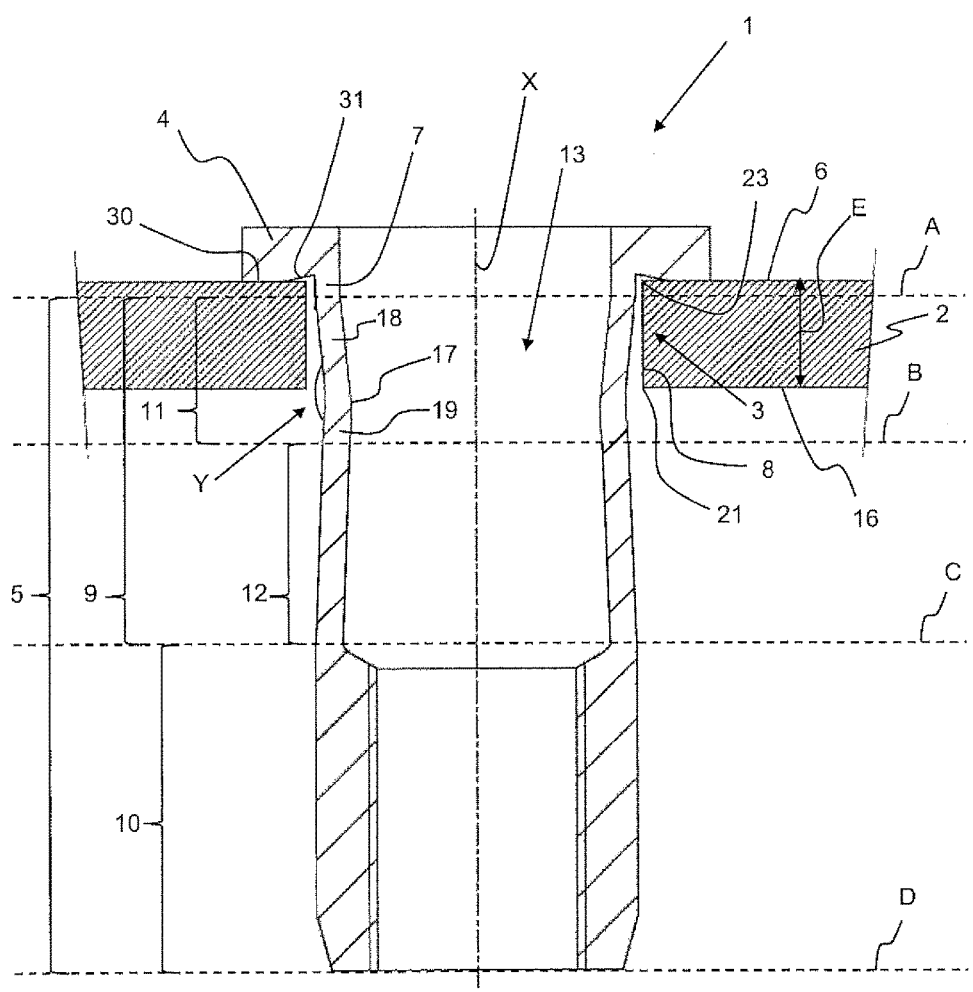
FIG. 4 schematically illustrates a sectional view of another embodiment of a piece to be crimped according to the invention, mounted on a support, before crimping.

In FIGS. 1, 2 and 4, there is shown a piece 1 to be crimped on a support 2. The support can be made out of a metal or a composite material. Preferably, the support 2 is made out of a composite material to which the piece 1 is particularly adapted.

Before crimping, the piece 1 is introduced into a recess 3 in the support 2. The piece 1 comprises a bearing head 4 and a shaft 5. The bearing head 4 is intended to come into contact with a first surface 6 of the support when the piece 1 is inserted into the recess 3. The bearing head 4 can further comprise a hollow proximal section 7 extending along a longitudinal axis X of the shaft 5. The proximal section 7 can have a cylindrical outer surface, having for example an hexagonal, square, or circular cross section. Here, cylinder means a solid limited by a cylindrical surface generated by a straight line, denoted generatrix, following a closed planar curve, denoted directrix, and two parallel planes intersecting the generatrices. In addition, the outer surface of the proximal section 7 is intended to come close to the inner surface 8 of the recess 3, that is to say without any contact with the support 2, so as not to generate radial stresses on the support.

The shaft 5 comprises a crimping section 9 and a distal section 10. The crimping section 9 is adjacent to the bearing head 4, in particular adjacent to the proximal section 7. The distal section 10 is adjacent to the crimping section 9, in other words, the crimping section 9 is located between the bearing head 4 and the distal section 10. Specifically, the distal section 10 provides the function of the piece 1. Indeed, the distal section 10 can be hollow or solid. For example, the distal section 10 can comprise an external thread for forming a screw or a bolt. The distal section 10 can also be threaded, as shown in FIGS. 1 and 4, and the piece 1 is then a nut. The end of the distal section 10 opposite the bearing head 4 can be open or closed. The piece 1 can also be used to hold two flat pieces to one another, the support 2 is then formed by the superposition of both flat pieces and the piece 1 is a rivet.

The crimping section 9 is intended to be deformed when crimping the piece 1 on the support 2. The crimping operation consists in deforming the crimping section 9, by traction or cold blow, along the longitudinal axis X. The crimping section 9 comprises a first section 11 and a second section 12. A first dotted line A is represented, which corresponds to the limit of separation between the bearing head 4 and the first section 11, a second dotted line B is represented, which corresponds to the limit of separation between the first section 11 and the second section 12, and a third dotted line C is represented, which corresponds to the limit of separation between the second section 12 and the distal section 10. A fourth dotted line D is also represented, which corresponds to the end limit of the distal section 10. The first section 11 comprises a hollow space 13 and this section 11 is adjacent to the bearing head 4, in particular to the proximal section 7. Regarding the second section 12, it is adjacent to the first section 11, in other words the second section 12 is located between the first section 11 and the distal section 10.

In general, in order to facilitate the deformation of the crimping section 9, the wall thickness of the distal section 10 is greater than or equal to that of the second section 12. Improving the deformation of the crimping section enables to prevent the first section from being inadvertently deformed outside the piece 1, and to prevent radial stresses from being generated on the inner surface 8 of the recess 3. Indeed, during the crimping operation, the deformation of the crimping section 9 can come into contact with the internal surface 8 of the recess 3, which can generate radial stresses at that point.

In general, the first section 11 is configured to deform, during the crimping operation, inside the hollow space 13 in the shaft 5 into a clearance flange 14, as shown in FIG. 2. The clearance flange 14 enables to limit the stresses generated on the support 2 when crimping the piece 1. In particular, the first section 11 is configured to limit the radial stresses on the support 2. In addition, the clearance flange 14 is formed inside the hollow space 13 so that the outer surface of the first section 11 is not in contact with the inner surface of the recess 3. Thus, when deforming, the first section 11 does not generate radial stresses on the support 2. radial stresses, or radial constraints, mean forces exerted in a direction perpendicular to the longitudinal axis X.

The second section 12 is configured to deform outside the piece 1 into a crimping flange 15, as illustrated in FIG. 2. The crimping flange 15 comes into contact with the second surface 16 of the support 2 for crimping the piece 1 to the support 2. The crimping flange 15 enables to wedge the support 2 with the bearing head 4 in order to fix the piece 1 to the support 2. The crimping flange 15 only generates axial stresses along the longitudinal axis X, on the support 2.

According to a preferred embodiment, the first section 11 comprises a bend 17 projecting inside the hollow space 13 in the shaft 5. Bend means a curvature of the wall of the shaft 5 of the piece 1. The bend 17 forms a salient angle at the point where the shaft wall turns. This bend 17 is also called inner bend. The inner bend subdivides the first section 11 into a first portion 18 and a second portion 19. The first portion 18 preferably has a truncated shape, it is adjacent to the bearing head 4, in particular to the proximal section 7, and widens in the direction of the bearing head 4. Preferably, the second portion 19 is also truncated, it is adjacent to the second section 12 and widens in the direction opposite the bearing head 4. The inner bend 17 can have protruding edges. The bend 17 can also be rounded, for example when it obtained by deforming the shaft of a piece 1 by means of jaws with rounded ends.

Preferably, the second section 12 has a truncated shape widening in the direction opposite the bearing head 4, as shown in FIG. 4. In the embodiments illustrated in FIGS. 1 and 4, the second truncated portion 19 and the second segment 12 are adjacent and they have the same thickness. The second portion 19 and the second section 12 form a crimping segment. In particular, the second section 12 is hollow and the thickness of its wall is equal to that of the first section 11. Thus, there is provided a piece, which can be made from a blank having a cylindrical hollow body with a circular, square, or hexagonal cross section, and by deforming the wall of the hollow body, for example by means of jaws, at a point of the hollow body in order to form the inner bend 17. The piece 1 can also be made by means of a machine that makes the inner bend 17 together with the piece, by forming a bend at the wall of the shaft 5. Advantageously, the second section 12 can also comprise another bend 20 projecting outside the shaft 5, as shown in FIG. 1. This bend 20 is called outside bend, it enables to start the deformation of the second section 12 in order to facilitate the formation of the crimping flange 15, in order to improve the crimping of the piece 1 on the support 2.

Advantageously, the position of the inner bend 17 relative to the bearing head 4 depends on the thickness E of the support 2. Preferably, the height of the connection of the proximal section 7 to the first portion 18, denoted thereafter by height of the inner bend 17, is equal to the thickness E of the support 2. In other words, the inner bend 17 is located at the second surface 16 of the support 2. The height of the inner bend 17 can be equal to the thickness E of the support 2 with a certain tolerance. In particular, the height of the inner bend 17 is determined so that the deformation of the crimping section 9 is such that the crimping flange 15 comes into contact with the second surface 16 without any radial stresses on a first edge 21 between the inner surface 8 of the recess 3 and the second surface 16. In the examples illustrated in FIGS. 1 and 4, the inner bend 17 faces the second surface 16, before crimping and after crimping, as illustrated in FIG. 2, the crimping flange 15 has a planar surface in contact with the second surface 16. In general, the crimping flange 15 bears on the second surface 16 of the support 2 so as to assuring the crimping of the piece 1. More particularly, the crimping flange 15 is spaced from the first edge 21, that is to say the crimping flange 15 is not in contact with the first edge 21 so as to prevent radial stresses from being generated at the first edge 21.

Furthermore, when the support 2 has a small thickness E, that is to say less than 2 mm, the piece 1 does not necessarily comprise a proximal section 7. According to another example, when the support 2 has a high thickness E, the piece 1 can comprise a proximal section 7 having a nonzero height.

For example, the length of the outer generatrix of the crimping segment is greater than or equal to that of the outer generatrix of the first portion 18. Thus, it contributes the formation of a crimping flange 15.

According to another advantage, the salient angle Y between the portions 18, 19 of the first section 11 is comprised between 90° and 175°. Preferably, the angle Y is equal to 170°.

The bearing head 4 can further comprise a bearing zone 30 intended to be in contact with the first surface 6 of the support 2, and a clearance zone 31 at a distance from the first surface 6 of the support 2, that is to say that the clearance zone 31 is not in contact with the first surface 6. The bearing zone 30 can correspond to a first planar part of a bearing surface of the bearing head 4. The bearing surface faces the first surface 6 of the support 2. The first planar part 30 preferably extends perpendicular to the longitudinal axis X of the shaft 5, so as to provide an effective bearing when the first surface 6 is also planar. For example, the clearance zone 31 can be a second planar part of the bearing surface, inclined with respect to the first planar part 30 so that the bearing surface is not in contact with the first surface 6. The second planar part 31 is adjacent to the proximal section 7, is located between the first planar part 30 and the proximal section 7. Thus, when the piece is inserted into the recess 3, the support zone 30 comes into contact with the first surface 6 of the support, and the clearance zone 31 prevents the bearing surface and the first surface 6 from contacting each other. More particularly the clearance zone is not in contact with a second edge 23 of the recess 3 between the first surface 6 and the inner surface 8 of the recess 3. The clearance zone 31 thus limits the radial stresses that can be exerted at the second edge 23 of the recess 3. Further, when the outer surface of the proximal section 7 is not in contact with the inner surface 8 of the recess 3, as shown in FIGS. 1, 2 and 4, the clearance zone 31 prevents the bearing head 4 and the second edge 23 of the recess 3 from contacting each other, which prevents any radial or axial stress from occurring on the second edge 23. In FIG. 2, it is noted that the piece 1 is situated at a distance from the first and second edges 21, 23 of the support 2, and at a distance from the inner surface 8 of the recess 3. This limits effectively the generation of possible stresses, in particular radial stresses, on the support 2.

In FIG. 2, it is noted that the piece 1 is situated at a distance from the first and second edges 21, 22 of the support 2, and at a distance from the inner surface 8 of the recess 3.

This limits effectively the generation of possible stresses, in particular radial stresses, on the support 2.

In FIG. 2, it is also represented a device comprising a support 2 provided with a recess 3 into which the piece 1 as defined above is inserted. The piece 1 is represented in FIG. 2 once it is crimped on the support 2.

Figure 3:
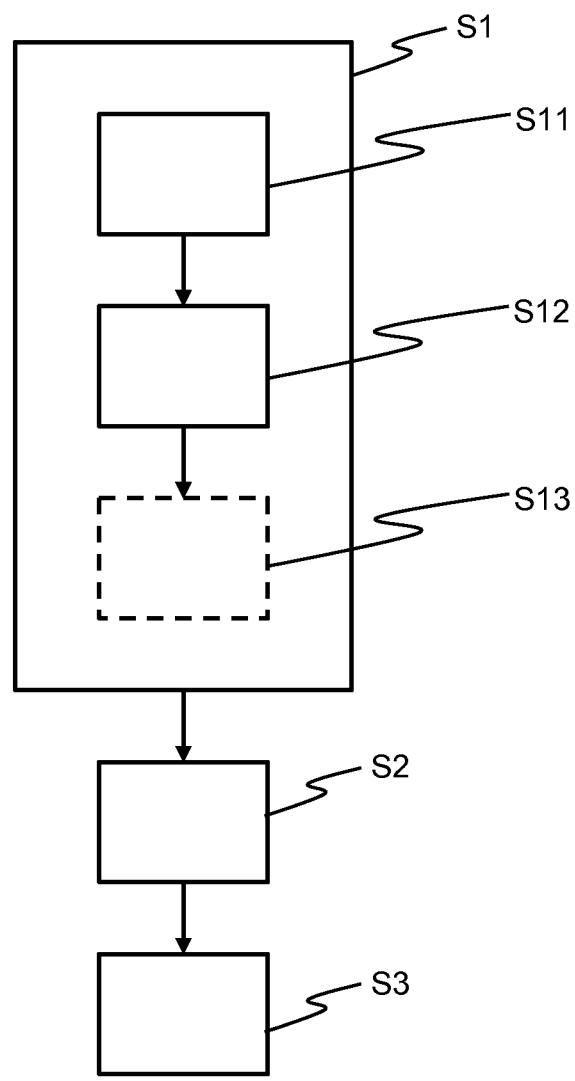
FIG. 3 schematically illustrates the main steps of a method for manufacturing a device provided with a support and a piece crimped on the support.

In FIG. 3, it is represented the main steps of a method for manufacturing the device shown in FIG. 2, and a method S1 for manufacturing the piece 1 to be crimped. The method for manufacturing the device comprises the steps S11 to S13 of the method S1 for manufacturing the piece 1 to be crimped, the last step S13, shown in dotted lines in FIG. 3, being optional, and an step S2 of inserting the piece 1 to be crimped into the recess 3 of the support 2. The method for manufacturing the device can comprise a step S3 of crimping the piece 1 on the support 2.

The method S1 of manufacturing the piece 1 to be crimpled comprises a step of forming the crimping section 9 at the shaft 5 of the piece. The step of forming the crimping section 9 comprises a formation of the first section S11 and a formation of the second section S12. The steps of forming the first and second sections S11, S12 can be carried out simultaneously. More particularly, the step of forming the first section 11 comprises a formation of a bend 17 protruding inside the hollow space 13 in the shaft 5 and subdividing the first section 11 into a first truncated portion 18 adjacent to the bearing head 4 and widening in the direction of the bearing head 4, and a second truncated portion 19 adjacent to the second section 12 and widening in the direction opposite the bearing head 4. For example, the step of forming the bend 17 of the first section can be carried out from a step of blowing the shaft 5. According to another example, the step of forming the bend 17 of the first section 11 can be carried out from a step of stamping the shaft 5 in which the jaws are tightened against the shaft in order to deform it inside the hollow space in the shaft. Alternatively, the step of forming the bend 17 of the first section 11 can be carried from a rolling step in which the shaft is rotatingly driven around the longitudinal axis X and the jaws are tightened against the shaft 5.

The method S1 for manufacturing the piece 1 to be crimped can further comprise a step S13 of thermally treating the piece at a temperature above 100° C. More particularly, the thermal treatment step is carried out on the crimping section 9. For example, the thermal treatment is carried by putting the whole piece 1, or only the crimping section 9, into an oven. The thermal treatment step S13 enables to make the crimping section more ductile. The thermal treatment S13 enables to make the deformation of the crimping section easier during the crimping operation. When the piece is made out of aluminum, the thermal treatment is carried out at a temperature between 320° C. and 400° C. When the piece is made out of stainless steel, the thermal treatment is carried out at a temperature between 1050° C. and 1100° C. When the piece is made out of steel, the thermal treatment is carried out at a temperature between 720° C. and 1100° C. In general, when manufacturing a piece to be crimped out of stainless of non-stainless steel, or aluminum, a thermal treatment step is carried out, at least in the crimping section of the piece, in order to make it more ductile so as to carry out a controlled crimping operation.

According to an advantageous implementation, the step of forming the second section 12 comprises a formation of a bend 20 projecting outside the shaft formed by an angle Z in the shaft. This advantageous implementation is particularly suitable when the piece to be crimped 1 is made out of a metal, more particularly when the piece is made out of stainless or non-stainless steel, or aluminum. According to the advantageous implementation, the method S1 for manufacturing the piece to be crimped lacks a step S13 of thermally treating the piece at a temperature above 100° C. Indeed, unexpectedly, the piece 1 to be crimped provided with an inner bend 17 and an outer bend 20, when made out of metal, does not require a thermal treatment. Indeed, the outer bend 20 improves the start of the crimping process and cooperates with the inner bend 17 so as to make the crimping section 9 sufficiently deformable to carry out a controlled crimping operation. Alternatively, it is always possible to carry out thermal treatment step S13 on the metallic piece provided with an inner bend 17 and an outer bend 20, or locally at the crimping section of the piece.

The piece to be crimped generate no or little radial stresses on the support on which it is crimped. The piece and its manufacturing method described above are particularly suitable for supports made out of composite materials, which are more fragile than most metals and which can crack or delaminate in case of high radial stresses. Such a piece and such a method are particularly suitable for the automotive, naval or aircraft industry . . . .

The invention claimed is:

1. A piece to be crimped on a support, the piece comprising:
    a bearing head; and
    a shaft having a crimping section intended to be deformed when crimping the piece,
    wherein the crimping section comprising a first hollow section adjacent to the bearing head and a second section adjacent the first section,
    the second section being configured to deform outside the piece into a crimping flange for crimping the piece on the support,
    the first section comprising a bend projecting inside a hollow space of the shaft and subdividing the first section into a first truncated portion adjacent to the bearing head and widening in the direction of the bearing head and into a second truncated portion adjacent to the second section and widening in the direction opposite the bearing head,
    the first section being configured to deform inside the hollow space of the shaft into a clearance flange in order to limit stresses on the support when crimping the piece, and
    the second section having a truncated shape widening in the direction opposite the bearing head.

2. The piece according to claim 1, wherein the second truncated portion and the second section have the same thickness and form a crimping segment, the length of the outer generatrix of the crimping segment being greater than or equal to that of the outer generatrix of the first portion.

3. The piece according to claim 1, wherein the second section is hollow and the thickness of the wall of the second section is identical to that of the first section.

4. The piece according to claim 1, wherein the shaft comprises a distal section adjacent the second section, and the thickness of the wall of the distal section is greater than or equal to that of the second section.

5. The piece according to claim 1, wherein a salient angle between the first and second truncated portions of the first section is comprised between 90° and 175°.

6. The piece according to claim 1, wherein the bearing head comprises a bearing zone intended to be in contact with a surface of the support, and a clearance zone located at a distance from the surface of the support.

7. A device comprising a support provided with a recess into which the piece according to claim 1 is inserted.

8. A piece to be crimped on a support, the piece comprising:
- a bearing head; and
- a shaft having a crimping section indented to be deformed when crimping the piece,
- wherein the crimping section comprising a first hollow section adjacent to the bearing head and a second section adjacent to the first section,
- the second section being configured to deform outside the piece into a crimping flange for crimping the piece on the support,
- the first section comprising a bend projecting inside a hollow space of the shaft and subdividing the first section into a first truncated portion adjacent to the bearing head and widening in the direction of the bearing head and into a second truncated portion adjacent to the second section and widening in the direction opposite the bearing head,
- the first section being configured to deform inside the hollow space of the shaft into a clearance flange in order to limit stresses on the support when crimping the piece, and
- the second section comprising a bend projecting outside the shaft.

9. A method for manufacturing a piece to be crimped on a support, the piece comprising a bearing head and a shaft, the method comprising a step of forming, at the shaft, a crimping section intended to be deformed when crimping the piece, the step of forming the crimping section comprising:
- a formation of a first hollow section adjacent to the bearing head, and the first section comprising a bend projecting inside a hollow space of the shaft and subdividing the first section into a first truncated portion adjacent to the bearing head and widening in the direction of the bearing head and into a second truncated portion adjacent to a second section and widening in the direction opposite the bearing head, the first section being configured to deform inside the hollow space of the shaft into a clearance flange in order to limit stresses on the support when crimping the piece; and
- a formation of the second section adjacent to the first section having a truncated shape widening in the direction opposite the bearing head and configured to deform outside the piece into a crimping flange for crimping the piece on the support.

10. The method according to claim 9, wherein the second section is hollow and the thickness of the wall of the second section is identical to that of the first section.

11. The method for manufacturing a device provided with a support having a recess, the method comprising:
- manufacturing a piece to be crimped according to claim 9;
- introducing the piece into the recess; and
- crimping the piece on the support.

12. A method for manufacturing a piece to be crimped on a support, the piece comprising a bearing head and a shaft, the method comprising a step of forming, at the shaft, a crimping section intended to be deformed when crimping the piece, the step of forming the crimping section comprising:
- a formation of a first hollow section adjacent to the bearing head and the first section comprising a bend projecting inside a hollow space of the shaft and subdividing the first section into a first truncated portion adjacent to the bearing head and widening in the direction of the bearing head and into a second truncated portion adjacent to a second section and widening in the direction opposite the bearing head, the first section being configured to deform inside the hollow space of the shaft into a clearance flange in order to limit stresses on the support when crimping the piece; and
- a formation of the second section adjacent to the first section having a bend projecting outside the shaft and configured to deform outside of the piece into a crimping flange for crimping the piece on the support.

13. The method according to claim 12, wherein the piece to be crimped is made out of a metal and the method for manufacturing the piece to be crimped lacks a step of thermally treating the piece at a temperature above 100° C.

* * * * *